(12) United States Patent
Lin et al.

(10) Patent No.: US 11,796,779 B2
(45) Date of Patent: Oct. 24, 2023

(54) LIGHT PATH ADJUSTMENT MECHANISM

(71) Applicant: YOUNG OPTICS INC., Hsinchu (TW)

(72) Inventors: Wei-Szu Lin, Hsinchu (TW); Yu-Chen Chang, Hsinchu (TW); Chih-Chien Lin, Hsinchu (TW); Yu-Ting Cheng, Hsinchu (TW); Kuan-Lun Cheng, Hsinchu (TW)

(73) Assignee: YOUNG OPTICS INC., Hsinchu Science Park (TW)

( * ) Notice: Subject to any disclaimer, the term of this patent is extended or adjusted under 35 U.S.C. 154(b) by 315 days.

(21) Appl. No.: 16/822,695

(22) Filed: Mar. 18, 2020

(65) Prior Publication Data

US 2020/0301118 A1 Sep. 24, 2020

(30) Foreign Application Priority Data

Mar. 20, 2019 (TW) ................. 108109627

(51) Int. Cl.
*G02B 17/04* (2006.01)
*G03B 21/20* (2006.01)
*H02K 41/035* (2006.01)
*G02B 7/18* (2021.01)

(52) U.S. Cl.
CPC ........... *G02B 17/04* (2013.01); *G02B 7/1805* (2013.01); *G03B 21/2066* (2013.01); *H02K 41/0356* (2013.01); *H02K 2201/18* (2013.01)

(58) Field of Classification Search
CPC ............................ G02B 7/00; G02B 7/18–1822
See application file for complete search history.

(56) References Cited

U.S. PATENT DOCUMENTS

| | | | | |
|---|---|---|---|---|
| 5,552,922 A | * | 9/1996 | Magarill | G02B 26/0883 359/833 |
| 6,464,363 B1 | * | 10/2002 | Nishioka | G02B 17/086 359/224.1 |
| 6,618,209 B2 | * | 9/2003 | Nishioka | G02B 26/0825 359/291 |
| 6,658,208 B2 | * | 12/2003 | Watanabe | G02B 27/646 396/89 |
| 6,791,741 B2 | * | 9/2004 | Hishioka | G02B 3/14 359/224.1 |
| 6,833,966 B2 | * | 12/2004 | Nishioka | G02B 5/1828 359/846 |
| 6,880,935 B1 | * | 4/2005 | Dewald | G03B 21/208 348/E9.027 |

(Continued)

FOREIGN PATENT DOCUMENTS

JP 2008096932 A * 4/2008
WO WO 2016/124782 A1 8/2016

*Primary Examiner* — Christopher Stanford
(74) *Attorney, Agent, or Firm* — Muncy, Geissler, Olds & Lowe, P.C.

(57) ABSTRACT

A light path adjustment mechanism includes a bracket, a light valve, a carrier, a first axis, a second axis and an optical plate member. A surface normal of a surface of the light valve crosses the bracket to define an intersection closest to the surface of the light valve, and the bracket has an end point furthest from the intersection measured in the direction of the surface normal. A distance between the intersection and the surface measured in the direction of the surface normal is smaller than a distance between the intersection and the end point measured in the direction of the surface normal.

11 Claims, 16 Drawing Sheets

(56) References Cited

U.S. PATENT DOCUMENTS

| | | | |
|---|---|---|---|
| 6,924,944 B2* | 8/2005 | Sekiyama | G03B 13/06 349/1 |
| 7,576,932 B2* | 8/2009 | Vandorpe | H04N 9/3105 359/837 |
| 8,016,429 B2 | 9/2011 | Chang et al. | |
| 9,250,509 B2* | 2/2016 | Markle | G03B 27/42 |
| 9,933,697 B2* | 4/2018 | Lambot | G03B 21/008 |
| 10,042,145 B2* | 8/2018 | Maeda | G02B 26/0833 |
| 10,324,362 B2* | 6/2019 | Sawai | G02B 27/126 |
| 2003/0170024 A1* | 9/2003 | Nishioka | G02B 26/0825 398/43 |
| 2008/0078262 A1 | 4/2008 | Murata et al. | |

* cited by examiner

LIGHT PATH ADJUSTMENT MECHANISM

BACKGROUND OF THE INVENTION a. Field of the Invention

The invention relates generally to an optical mechanism, and more particularly to a light path adjustment mechanism.

b. Description of the Related Art

Nowadays, various image display technologies are widely used in daily life. In order to increase the resolution and picture quality of an image display device, a light path adjustment mechanism can be used to adjust propagation paths of light in the image display device to shift pixel images and thereby increase addressability. However, the number of components, weight and occupied space of a conventional light path adjustment mechanism is considerably large, and thus the entire mechanism is difficult to be miniaturized. Therefore, it is desirable to provide a simple, reliable, light and compact design of a light path adjustment mechanism.

BRIEF SUMMARY OF THE INVENTION

According to one aspect of the present disclosure, a light path adjustment mechanism includes a bracket, a light valve, a carrier, a first axis, a second axis and an optical plate member. The light valve has a surface, a surface normal of the surface crosses the bracket to define an intersection closest to the surface of the light valve, and the bracket has an end point furthest from the intersection measured in the direction of the surface normal. A distance between the intersection and the surface measured in the direction of the surface normal is smaller than a distance between the intersection and the end point measured in the direction of the surface normal. The carrier is disposed near the bracket, and the carrier includes an inner frame and an outer frame disposed outside the inner frame. The first axis is connected between the inner frame and the outer frame, and only one side of two sides of the first axis is provided with a first actuator. The second axis is connected between the outer frame and the bracket, and only one side of two sides of the second axis is provided with a second actuator. The optical plate member is disposed on the carrier.

According to the above aspect, a part of the light valve is allowed to insert in the opening of the bracket, so that the light path adjustment mechanism can be assembled in a position closer to the prism without being blocked by the light valve or other optical component. This may reduce the overall occupied space and shorten the back focus of optical lenses.

According to another aspect of the present disclosure, a light path adjustment mechanism includes a bracket, a carrier, a first pair of flexible members, a second pair of flexible members, an optical plate member and a prism. The carrier is disposed near the bracket, the first pair of flexible members is disposed on the carrier, and the second pair of flexible members is disposed between the carrier and the bracket. Only one side of two sides of the first pair of flexible members is provided with a first actuator, and only one side of two sides of the second pair of flexible members is provided with a second actuator. The optical plate member is disposed on the carrier, and the prism is disposed near the optical plate member. A minimum interval between a surface of the optical plate member and the prism is smaller than 3 mm.

According to the above aspect, the light valve may more approach the optical plate member and the prism to reduce the overall occupied space and the back focus of optical lenses.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. Further, "First," "Second," etc, as used herein, are used as labels for nouns that they precede, and do not imply any type of ordering (e.g., spatial, temporal, logical, etc.).

The following description relates in general to a light path adjustment mechanism used with an optical system (e.g., a display device or a projector) to modify or change light paths to enhance perceived image resolution, improve picture quality (e.g., eliminating dark regions or blurring image edges), or provide other beneficial effects. Further, it should be understood that the light path adjustment mechanism is not limited to a specific arrangement and location in the optical system.

Figure 1:
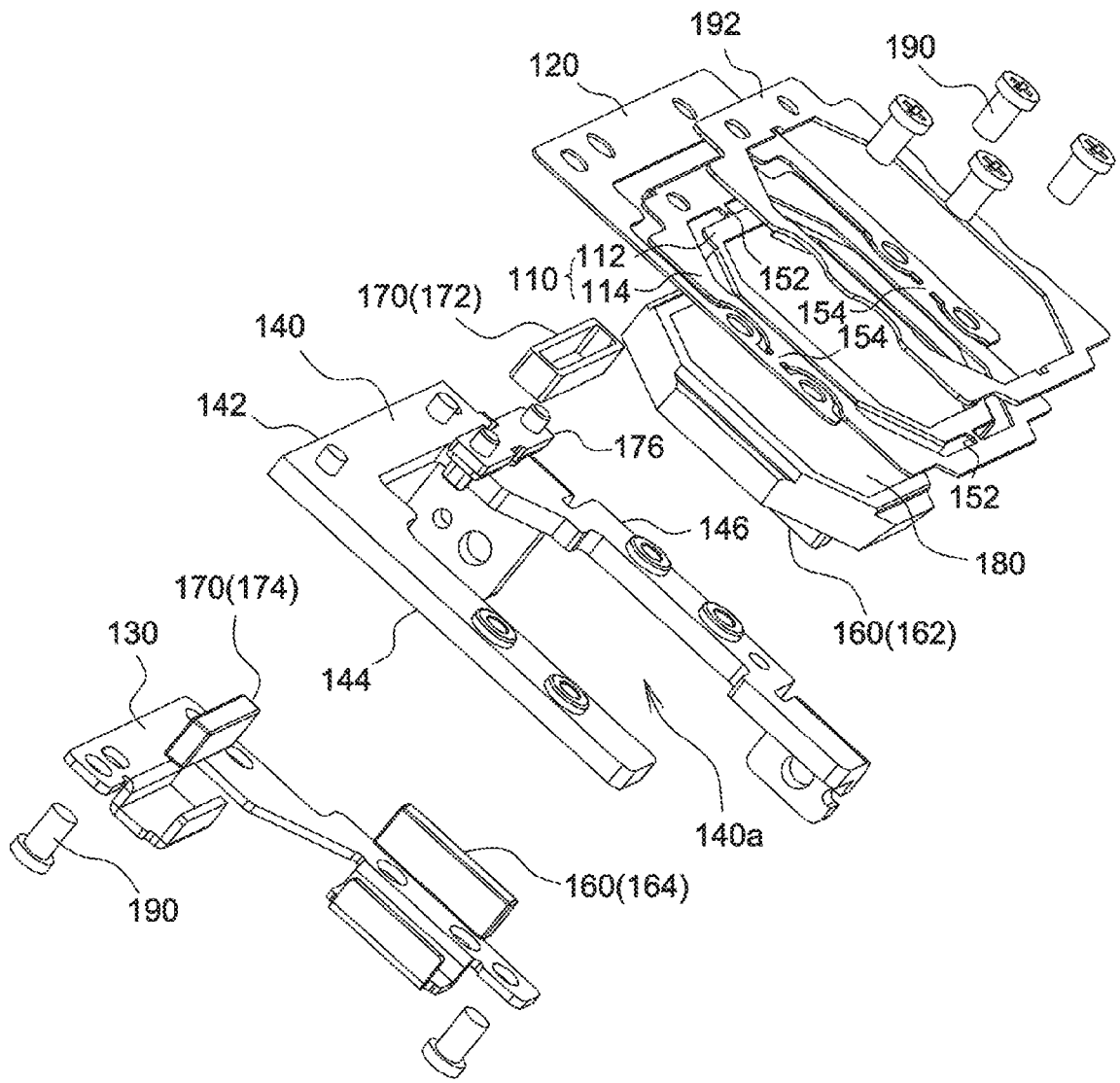
FIG. 1 shows an exploded view of a light path adjustment mechanism according to an embodiment of the invention.
Figure 2:
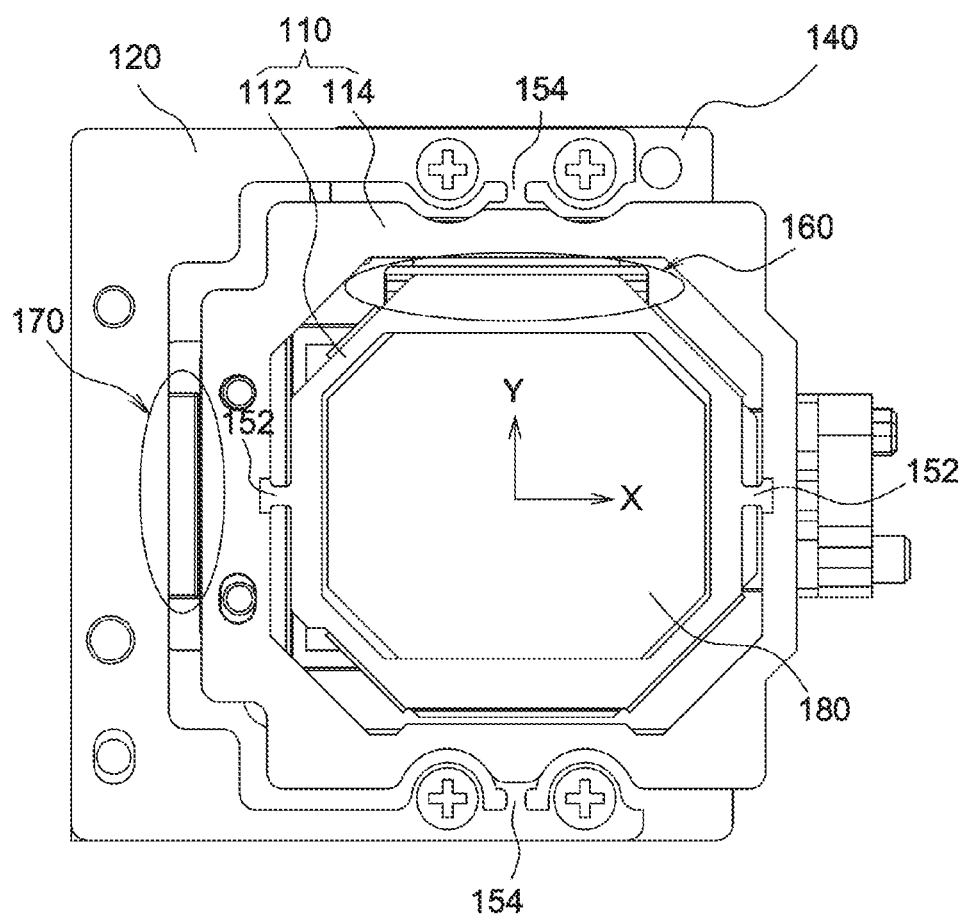
FIG. 2 shows a schematic plan view of an assembled light path adjustment mechanism as illustrated in FIG. 1.

FIG. 1 shows an exploded view of a light path adjustment mechanism according to an embodiment of the invention. FIG. 2 shows a schematic plan view of an assembled light path adjustment mechanism as illustrated in FIG. 1. With reference to FIG. 1, the light path adjustment mechanism 100 includes a carrier 110, a support 120, a magnet seat 130, a bracket 140, a first pair of flexible members 152, and a second pair of flexible members 154. The carrier 110 includes an inner frame 112 and an outer frame 114. In this embodiment, the outer frame 114 is disposed outside the inner frame 112 and connected to the inner frame 112 by the first pair of flexible members 152, and the inner frame 112 and the outer frame 114 are located at the same height or lie in the same plane. The outer frame 114 of the carrier 110 is connected to the support 120 by the second pair of flexible members 154. The carrier 110 and the support 120 are disposed on one side of the bracket 140, and the magnet seat 130 is disposed on another side of the bracket 140. In this embodiment, the bracket 140 has a first side 142, a second side opening 144 and a third opening 146 to form a U-shaped profile and define an opening 140a that allows for insertion or penetration of other optical component. Further, the light path adjustment mechanism 100 may include an optical plate member 180 and multiple actuators. The optical plate member 180 may be disposed on the carrier 110. For example, the optical plate member 180 may be disposed on the inner frame 112 of the carrier 110. The optical plate member 180 is not limited to a specific form or structure, so long as it may change, at least to some extent, the traveling direction of incoming light beams. For example, the optical plate member 180 may be, but is not limited to, a lens or a mirror. In this embodiment, multiple actuators include an actuator 160 and an actuator 170 disposed on different sides of the optical plate member 180. The actuator 160 may include a coil 162 and a magnet 164, and the actuator 170 may include a coil 172 and a magnet 174. The magnets 164 and 174 are fixed on the magnet seat 130, and the magnet seat 130 is fixed on one side of the bracket 140 to secure the magnets 164 and 174 to the bracket 140. The coil 162 is fixed on one side of the optical plate member 180, and the coil 172 is fixed on the coil seat 176. The coil seat 176 is fixed on the outer frame 114 of the carrier 110 to secure the coil 172 to the outer frame 114 of the carrier 110. Besides, the carrier 110, support 120 and magnet seat 130 are connected with or secured to the bracket 140 by fasteners 190 such as screws or pins. In other embodiment, the support 120 may be formed by a part of the bracket 140. Because the support 120 may be connected to the bracket 140 or formed as a part of the bracket 140, the outer frame 114 of the carrier 110 can be connected to the bracket 140 by the second pair of flexible members 154. Further, in one embodiment, a lens mount 192 is provided to lean against a periphery of the optical plate member 180 and thus help to hold the optical plate member 180 in place.

As shown in FIG. 2, the first pair of flexible members 152 connected between the inner frame 112 and the outer frame 114 define a first axis parallel to, for example, an X-axis direction, and the second pair of flexible members 154 connected between the outer frame 114 and the support 120 (bracket 140) define a second axis parallel to, for example, a Y-axis direction. In this embodiment, the actuator 160 and the actuator 170 are disposed on two sides of the optical plate member 180 perpendicular to each other, but the invention is not limited thereto. The actuator 160, including a coil 162 disposed on the optical plate member 180 and a magnet 164 disposed on the bracket 140 as shown in FIG. 1, is energized to generate attractive or repulsive forces that act on one end of the optical plate member 180, which causes the optical plate member 180 and the inner frame 112 to reciprocally rotate or tilt about the axis of the first pair of flexible members 152 (X-axis direction) as shown in FIG. 2. Similarly, the actuator 170, including a coil 172 disposed on the outer frame 114 and a magnet 174 disposed on the bracket 140 as shown in FIG. 1, is energized to generate attractive or repulsive forces that act on one end of the outer frame 114, which causes the optical plate member 180 and the outer frame 114 to reciprocally rotate or tilt about the axis of the second pair of flexible members 154 (Y-axis direction) as shown in FIG. 2. Therefore, the optical plate member 180 may tilt or rotate about two different axes to reach various positions within an angular range to reflect or refract incoming light beams, which may cause a change in the traveling direction and propagation path of incoming light beams. In one embodiment, an image beam that intends to impinge upon the optical plate member 180 is deflected by the optical plate member 180 that rapidly and alternately tilts among four different positions relative to the bracket 140 to form four different pixel images, thereby increasing the perceived image resolution at least by four times. According to the above embodiments, the light path adjustment mechanism may modify or change light paths to enhance image resolution, improve picture quality (e.g., eliminating dark regions or blurring image edges), or provide other beneficial effects. Moreover, at least part of the actuator can be disposed on the carrier to reduce occupied space, weight and component number, and the arrangement in which the actuator is disposed only on a single side of each axis may further reduce occupied space, weight and fabrication costs.

Figure 3A:
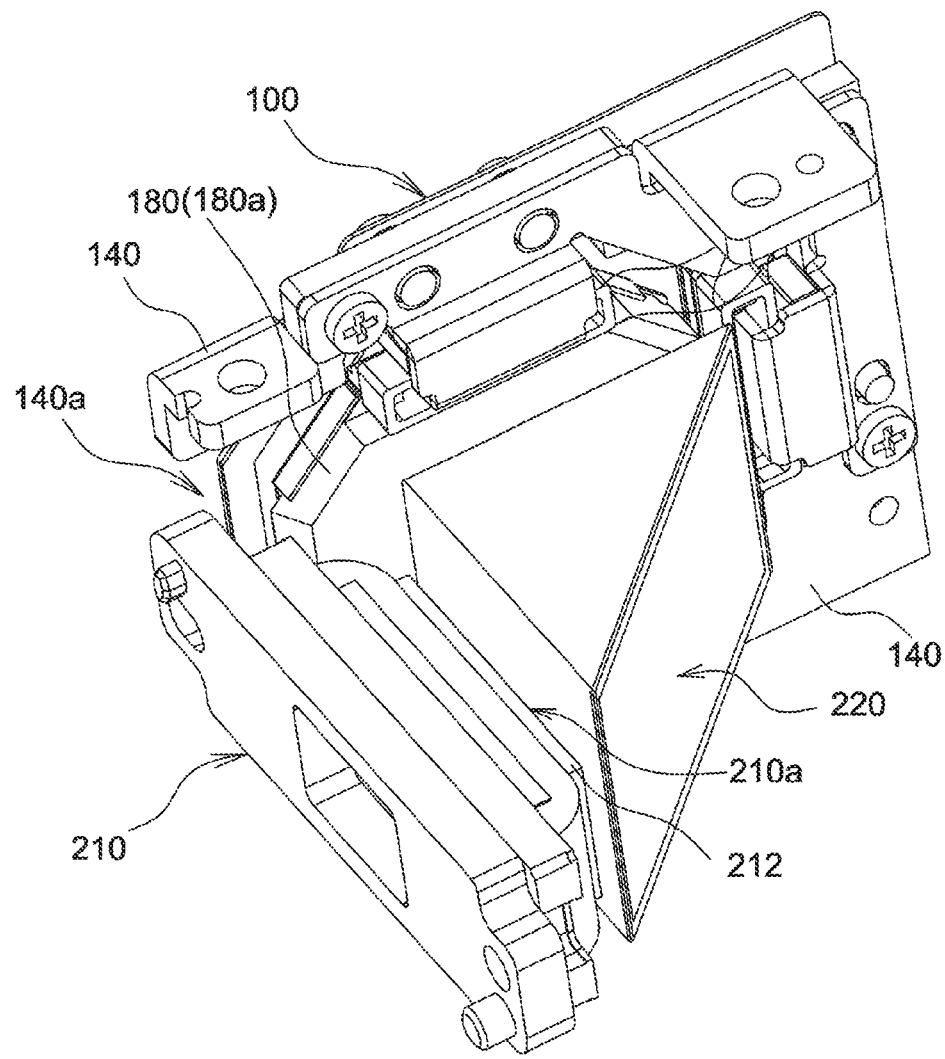
FIG. 3A shows a schematic diagram of a light path adjustment mechanism in cooperation with other optical components according to an embodiment of the invention.
Figure 3B:
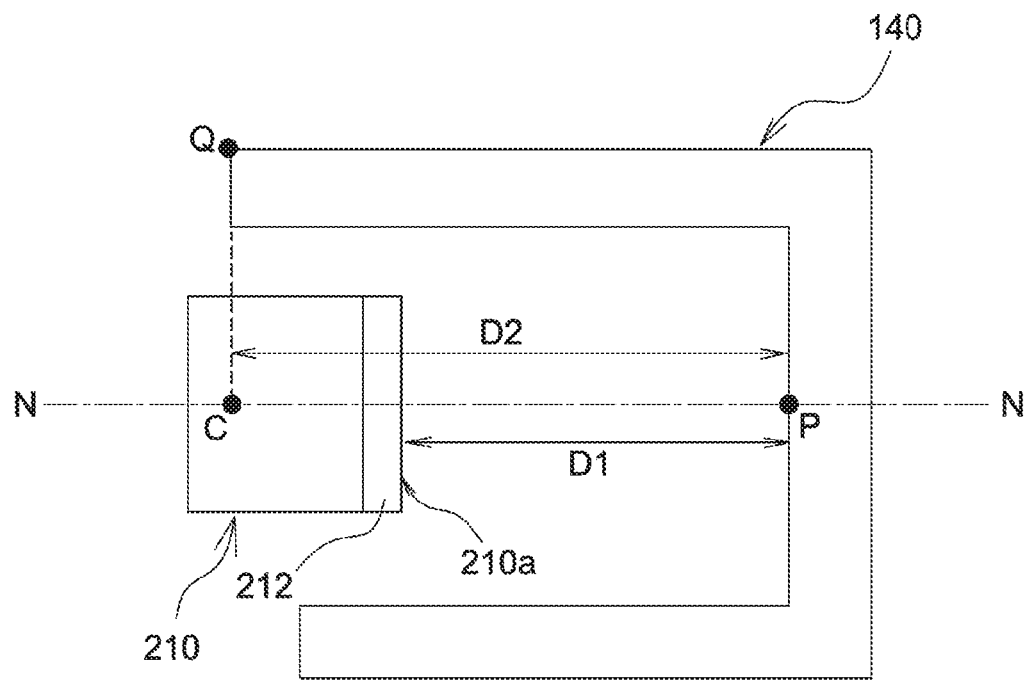
FIG. 3B shows a schematic diagram illustrating the arrangement of a light valve in relation to a light path adjustment mechanism according to an embodiment of the invention.
Figure 3C:
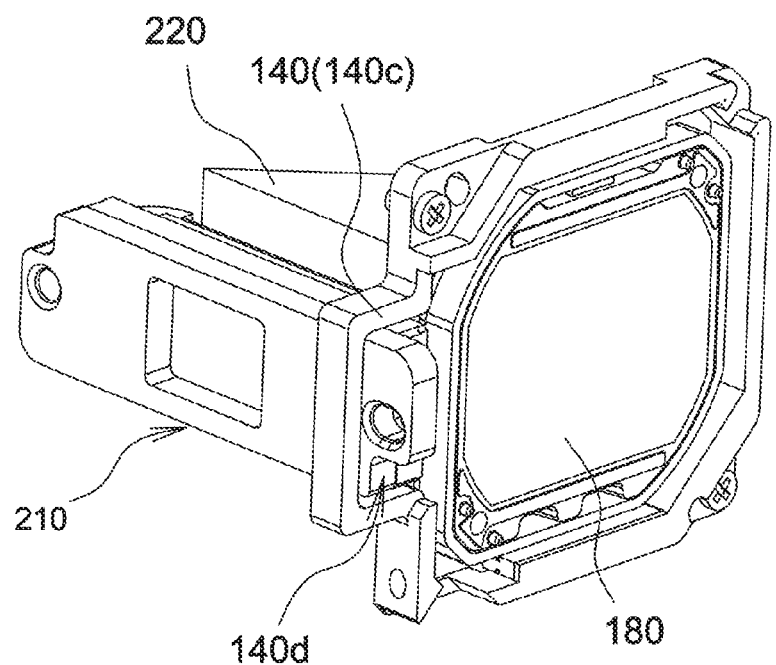
FIG. 3C shows a schematic diagram of a light path adjustment mechanism in cooperation with other optical components according to another embodiment of the invention.

FIG. 3A shows a schematic diagram of a light path adjustment mechanism in cooperation with other optical components according to an embodiment of the invention. As shown in FIG. 3A, in an optical system 200, the light path adjustment mechanism 100 may be disposed near a light valve 210 and a prism 220. The light valve 210 may be a digital micro-mirror device (DMD), a liquid-crystal-on-silicon panel (LCOS panel) or a transmissive type LCD panel. The prism 220 may be, for example, a total-internal-reflection (TIR) prism, a reverse total-internal-reflection (RTIR) prism, or a polarizing beam splitter (PBS) prism. In one embodiment, because an opening 140a is formed in one side of the bracket 140, a part of the light valve 210 is allowed to insert in the opening 140a, so that the light path adjustment mechanism 100 can be assembled in a position closer to the prism 220 without being blocked by the light valve 210. This may further reduce the overall occupied space and shorten the back focus of optical lenses. FIG. 3B shows a schematic diagram illustrating the arrangement of a light valve in relation to a light path adjustment mechanism according to an embodiment of the invention. Herein, a "surface" of the light valve 210 is defined as a surface of an outermost component (such as a cover glass 212) at the light-emitting side. For example, in case the light valve 210 is a digital micro-mirror device, the surface 210a of the light valve 210 is a surface of the cover glass 212. Alternatively, in case the light valve 210 is a liquid-crystal-on-silicon panel, the surface 210a of the light valve 210 is a surface of a glass substrate. Further, in case the light valve 210 is a transmissive type LCD panel, the surface 210a of the light valve 210 is a surface of a polarizer. As shown in FIG. 3B, a surface normal N of the surface 210a of the light valve 210 may cross the bracket 140 to form multiple intersections, and the intersection P is closest to the surface 210 among the multiple intersections. Further, each point of the bracket 140 may be projected on the surface normal N to form multiple projection points. For example, an end point Q is projected on the surface normal N to form a projection point C. In this embodiment, the projection point C of the end point Q is furthest from the intersection P among all projection points of the bracket 140 on the surface normal N. In other words, the end point Q is, measured in the direction of the surface normal N, furthest from the intersection P. Moreover, in this embodiment, a distance D1 between the intersection P and the surface 210a measured in the direction of the surface normal N is smaller than a distance D2 between the intersection P and the end point Q measured in the direction of the surface normal N. According to this arrangement, the light valve 210 may more approach the optical plate member 180 and the prism 220 shown in FIG. 3A to reduce the overall occupied space and the back focus of optical lenses. In one embodiment, as shown in FIG. 3A, the optical plate member 180 may be a lens/mirror 180a, a minimum interval between a surface of the optical plate member 180 (lens/mirror 180a) and the prism 220 is smaller than 3 mm, and a minimum interval between a surface of the optical plate member 180 (lens/mirror 180a) and a surface 210a of the light valve 210 is smaller than 1 mm. Note the U-shaped profile of the bracket 140 provided in the above embodiments is merely for exemplified purposes. The bracket 140 is not limited to a specific shape, as long as a room allows for the insertion of part of the light valve 210 (or other component that may interfere with the light path adjustment mechanism) is provided. In other embodiment, as shown in FIG. 3C, one end of the bracket 140 near the light valve 210 may extend to form a lug structure 140c, and the light valve 210 may insert into the opening 140d of the lug structure 140c. Therefore, the light path adjustment mechanism 100 is allowed to more approach the prism 220 due to the opening or extension at the end of the bracket 140 near the light valve 210, with the opening or extension being capable of providing a room for receiving a part of the light valve 210.

Figure 4:
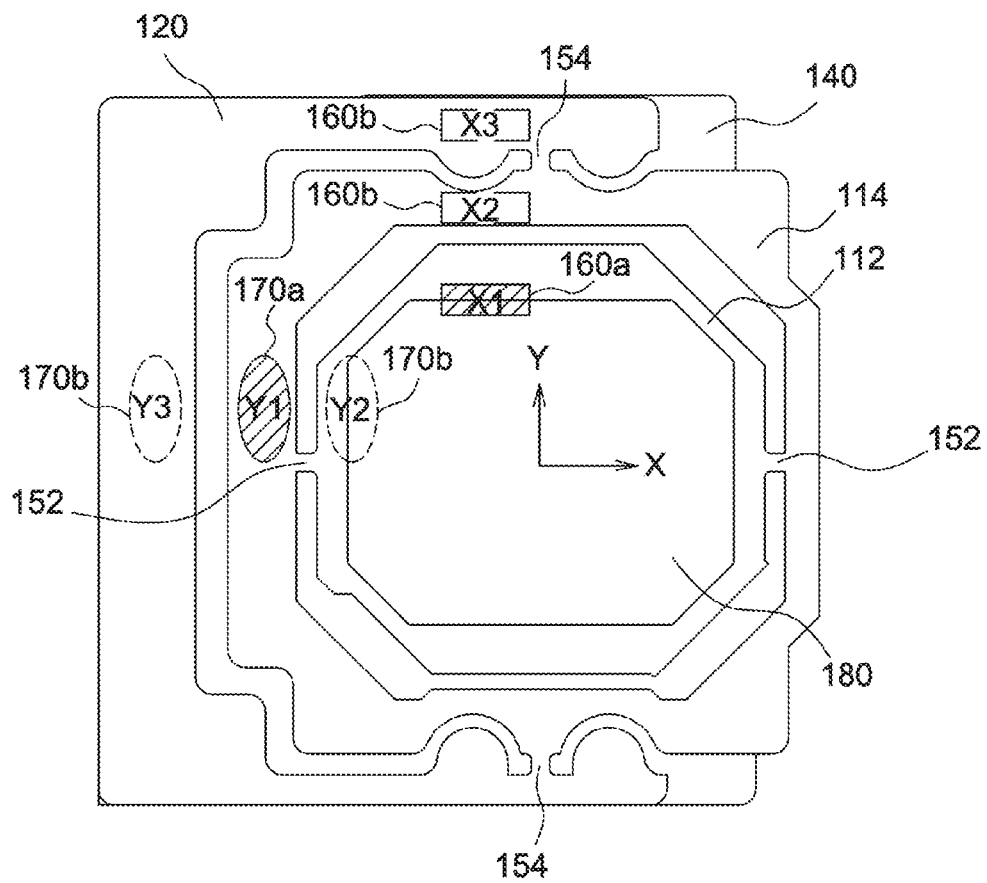
FIG. 4 shows a schematic diagram illustrating various arrangements of actuators.

Further, the components of an actuator, such as a magnet and a coil, are not limited to a specific arrangement. For example, as shown in FIG. 4, in order to allow the optical plate member 180 to tilt about the first pair of flexible members 152 (X-axis direction), a part 160a (a magnet or a coil) of the actuator 160 is disposed on the optical plate member 180 or the inner frame 112 (such as position X1), and other part 160b (a coil or a magnet) of the actuator 160 is disposed on the outer frame 114, the support 120 or the bracket 140 (such as position X2 or X3). Besides, in order to allow the optical plate member 180 to tilt about the second pair of flexible members 154 (Y-axis direction), a part 170a (a magnet or a coil) of the actuator 170 is disposed on the outer frame 114 (such as position Y1), and other part 170b (a magnet or a coil) of the actuator 170 is disposed on the optical plate member 180, inner frame 112, support 120 or bracket 140 (such as position Y2 or Y3).

In one embodiment, the carrier 110, the support 120, the magnet seat 130, the bracket 140, the first pair of flexible members 152 and the second pair of flexible members 154 may be all integrally formed as one piece using the same material. Alternatively, two or more than two of them may be integrally formed as one piece and are then combined with the remainder. For example, the carrier 110, support 120, bracket 140, first pair of flexible members 152 and second pair of flexible members 154 may be integrally formed as one piece using the same material and then connected with the magnet seat 130. Further, in one embodiment, the bracket 140 may be provided with a structure for storing magnets to thus omit the magnet seat 130.

Figure 5:
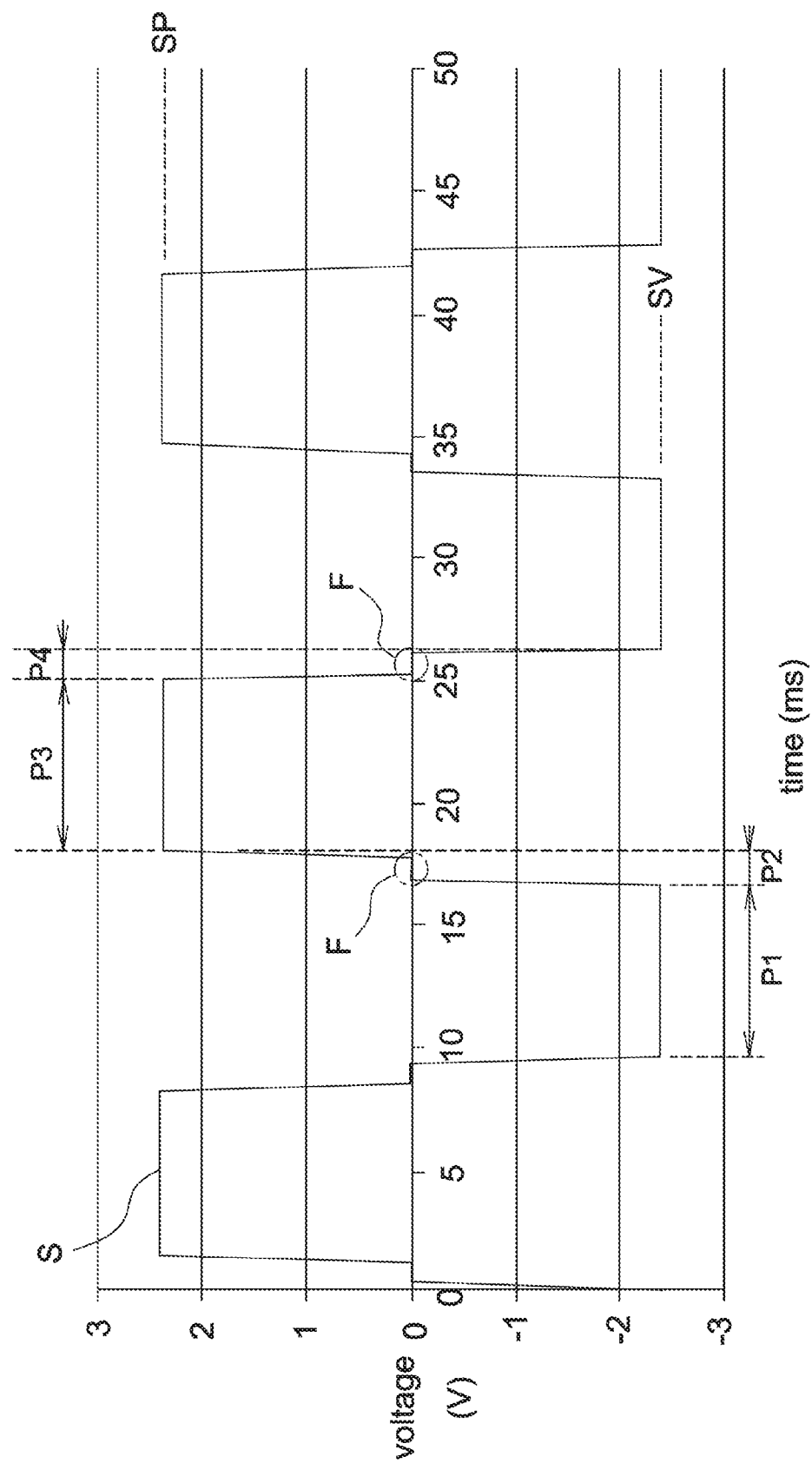
FIG. 5 shows a waveform diagram of a drive signal for an actuator according to an embodiment of the invention.

FIG. 5 shows a waveform diagram of a drive signal for an actuator according to an embodiment of the invention. As shown in FIG. 5, a drive signal S is in the form of a periodic stepwise square wave and includes, in one period, a lowest potential interval P1, a rising time P2, a highest potential interval P3 and a falling time P4. In the lowest potential interval P1, the optical plate member 180 is tilted to a first position, and, in the highest potential interval P3, the optical plate member 180 is tilted to a second position. Further, the transition from the first position to the second position or vice versa is realized during the rising time P2 or the falling time P4. In this embodiment, the lowest potential interval P1 of the drive signal S has a lowest voltage level SV, the highest potential interval P3 of the drive signal S has a highest voltage level SP, the lowest voltage level SV is increased to the highest voltage level SP during the rising time P2, and the highest voltage level SP is decreased to the lowest voltage level SV during the falling time P4. In this embodiment, during the rising time P2 the voltage level is continuously increased without showing decrease in any time point, but the rising time P2 includes a flat interval F whose voltage level substantially does not vary over time to therefore form a rising stepwise waveform. During the falling time P4 the voltage level is continuously decreased without showing increase in any time point, but the falling time P4 also includes a flat interval F whose voltage level substantially does not vary over time to therefore form a falling stepwise waveform. In this embodiment, the voltage level of the flat interval F is between the voltage level of the highest potential SP and the voltage level of the lowest potential SV. Moreover, a variation in the voltage level (a difference between the maximum and the minimum voltage level) of the flat interval is smaller than 0.1 percent of a difference between the voltage level of the highest potential SP and the voltage level of lowest potential SV. In one embodiment, an absolute value of the slop of the flat interval F is smaller than 1 V/ms.

Figure 6:
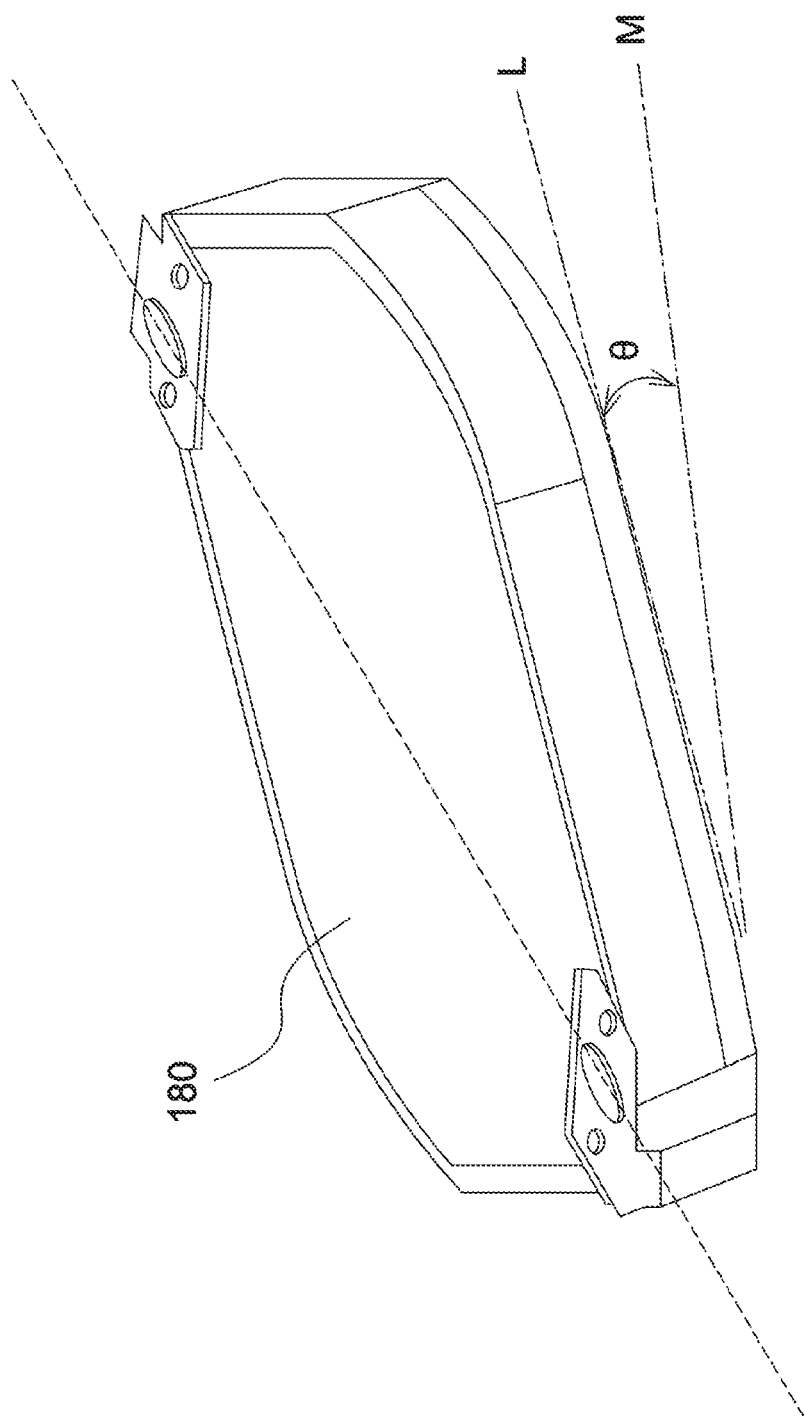
FIG. 6 shows a schematic diagram illustrating an optical plate member driven by the drive signal shown in FIG. 5 to lean towards different positions.

FIG. 6 shows a schematic diagram illustrating an optical plate member driven by the drive signal shown in FIG. 5 to lean towards different positions. For example, when the drive signal S fed to the actuator 160 is in the lowest potential interval P1, the actuator 160 tilts the optical plate member 180 towards a position M, and, when the drive signal S fed to the actuator 160 is in the highest potential interval P3, the actuator 160 tilts the optical plate member 180 towards a position L. Further, the transition from the position M to the position L or vice versa is realized during the rising time P2 or the falling time P4 of the drive signal S. Therefore, the optical plate member 180 may rotate at an angle θ between the position M and position L, and the value of the angle θ is determined by the amplitudes of the drive signal S in the lowest potential interval P1 and the highest potential interval P3.

Figure 7:
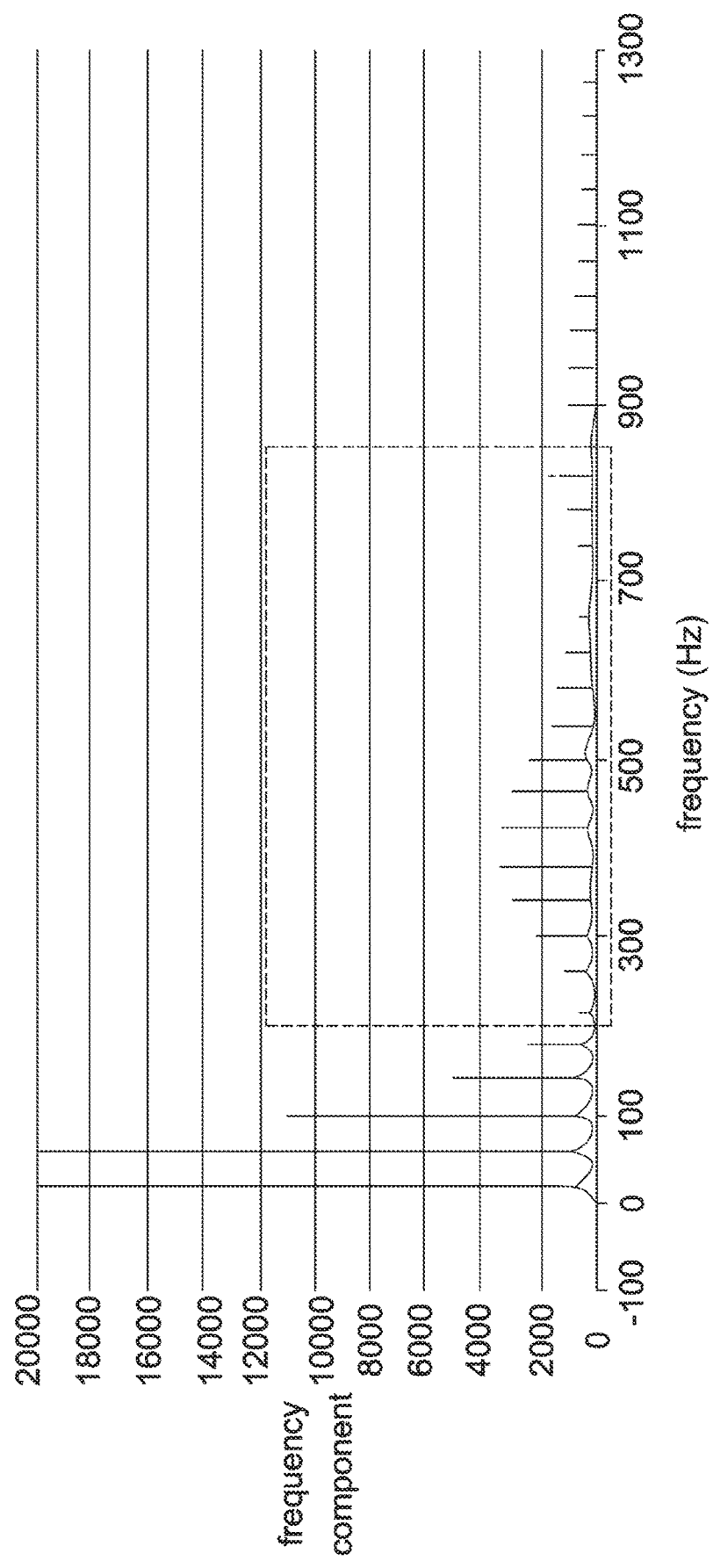
FIG. 7 shows a time-frequency transform diagram illustrating the corresponding frequency component of the Fourier time series data for an operating optical plate member driven by the drive signal shown in FIG. 5.
Figure 8:
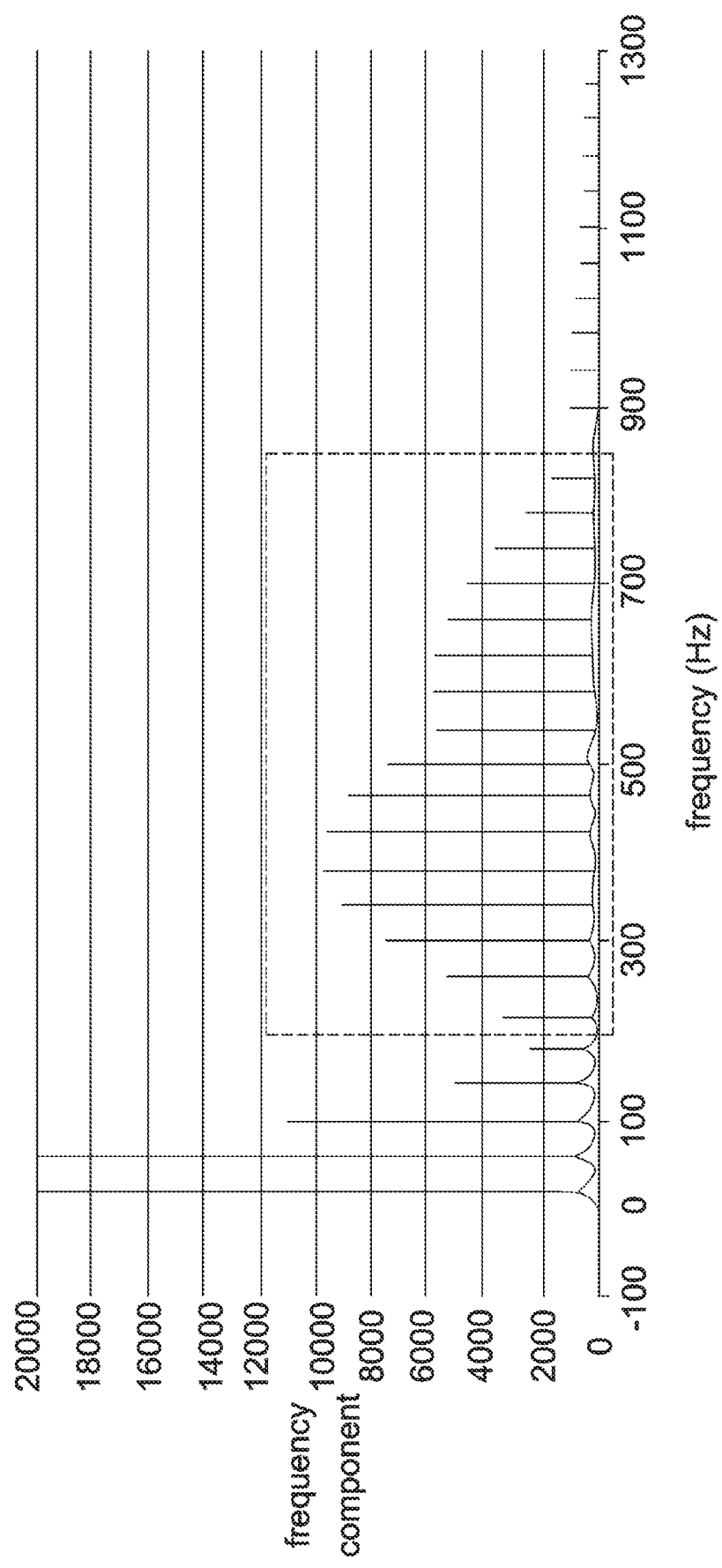
FIG. 8 shows a time-frequency transform diagram illustrating the corresponding frequency component of the Fourier time series data for an operating optical plate member driven by the drive signal shown in FIG. 9.
Figure 9:
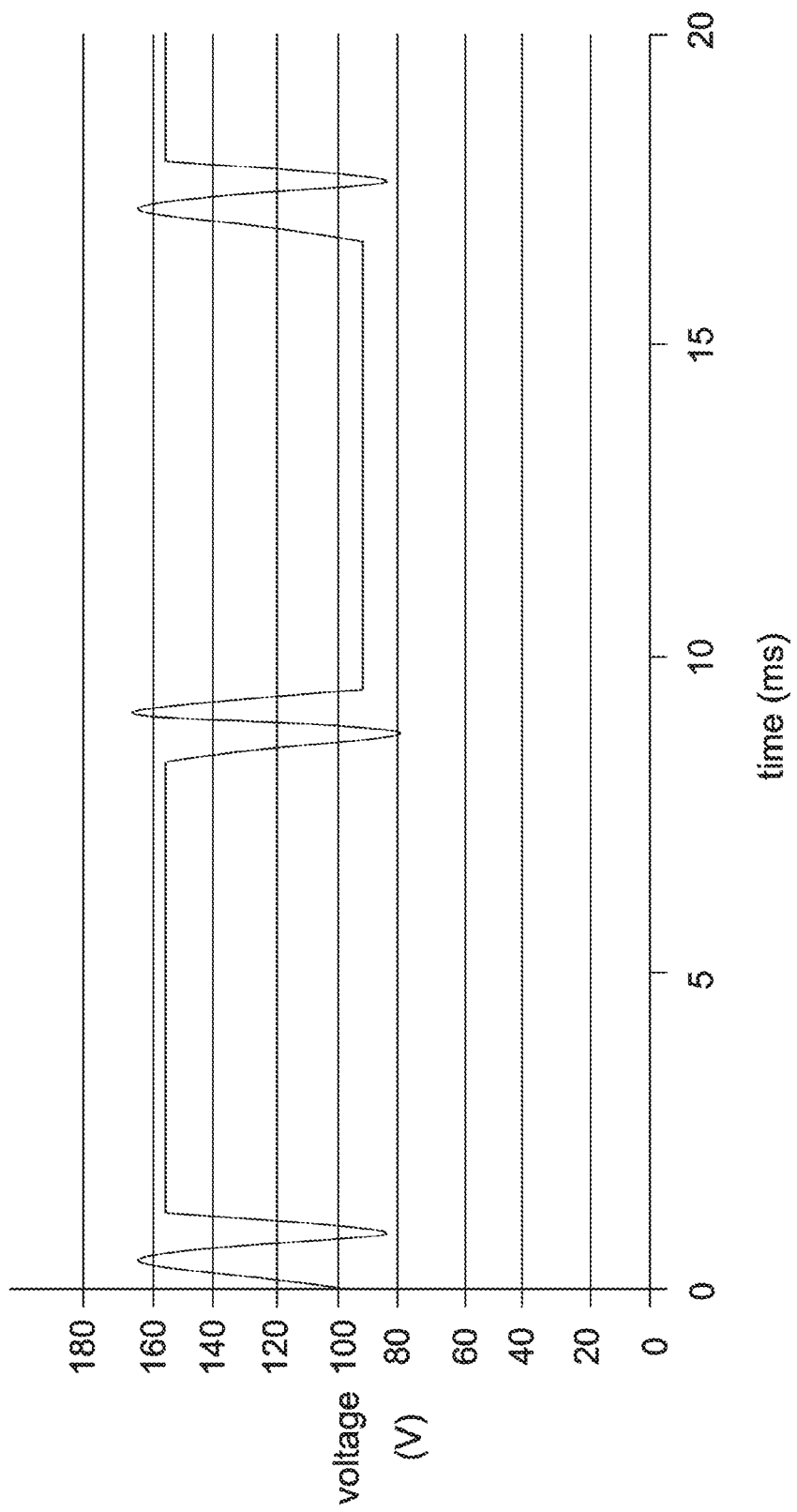
FIG. 9 shows a conventional waveform diagram of a drive signal for an actuator.

FIG. 7 shows a time-frequency transform diagram illustrating the corresponding frequency component of the Fourier time series data for an operating optical plate member driven by the drive signal (stepwise waveform in rising/falling time) shown in FIG. 5. FIG. 8 shows a time-frequency transform diagram illustrating the corresponding frequency component of the Fourier time series data for an operating optical plate member driven by the drive signal (sin waveform in rising/falling time) shown in FIG. 9. Comparing FIG. 7 and FIG. 8 with respect to the portion enclosed by a dashed rectangle, it can be clearly seen using the drive signal shown in FIG. 5 with a stepwise waveform in rising/falling time may considerably decrease the frequency response in the medium/high frequency band (such as 300-780 Hz) and thus reduce the noise of a rotating optical plate member and achieve more stable and precise controls for rotation angles. In one embodiment, each of the rising time P2 and the falling time P4 in one period may be set to be 0.8-1.0 ms to enhance the reduction of frequency response.

Figure 10:
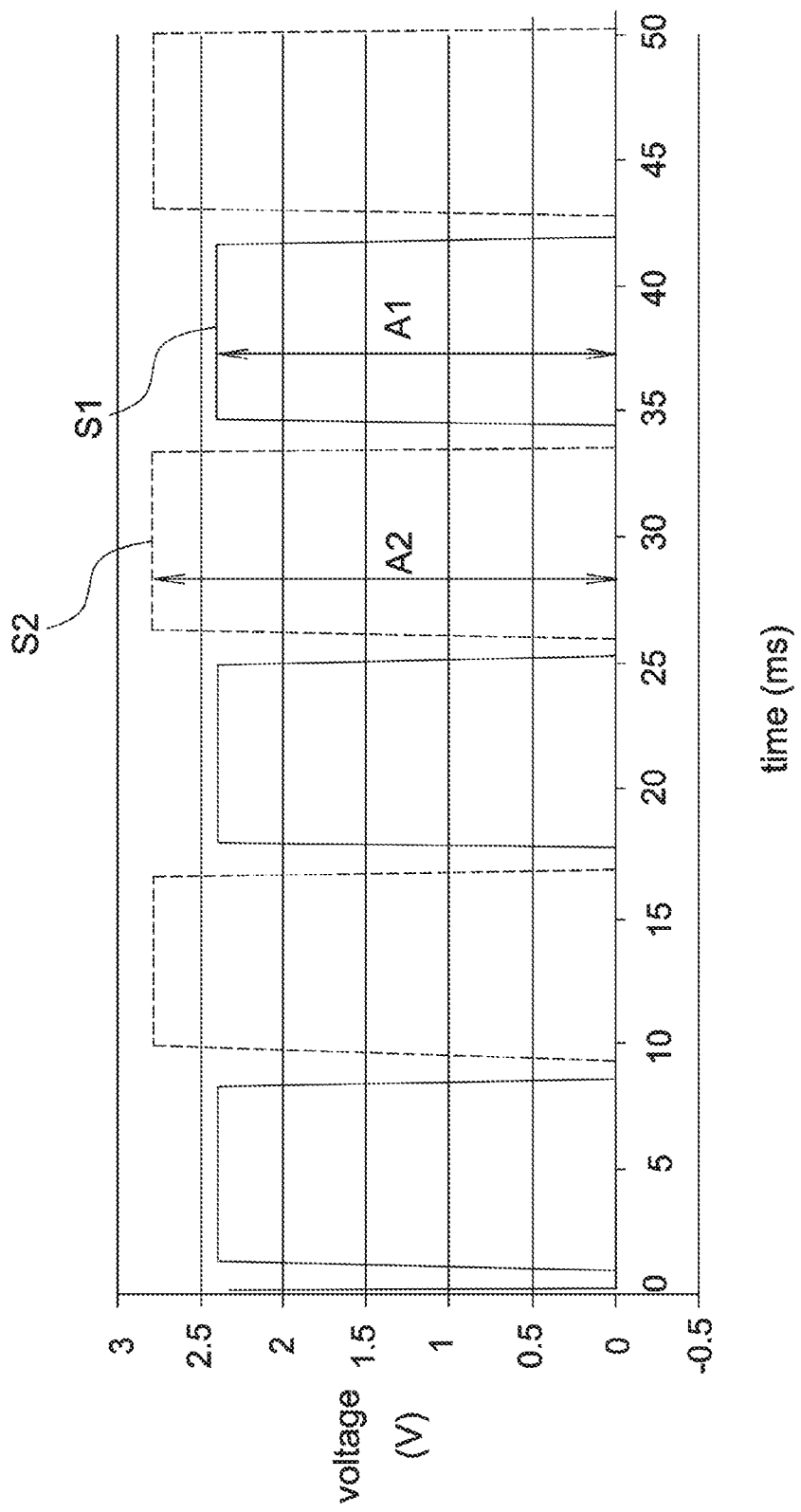
FIG. 10 shows a waveform diagram of a drive signal for an actuator according to another embodiment of the invention.
Figure 11:
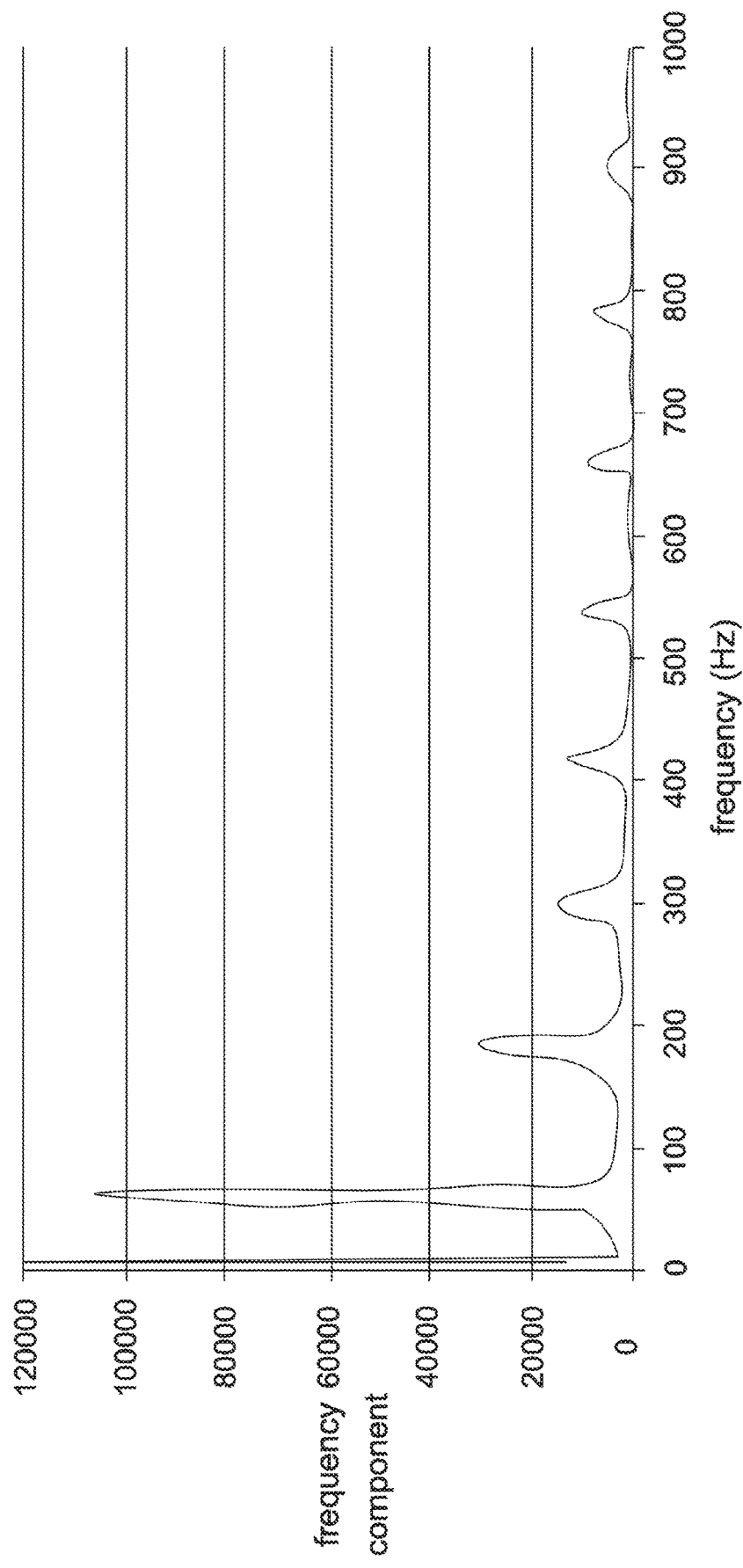
FIG. 11 shows a time-frequency transform diagram illustrating the corresponding frequency component of the Fourier time series data for an operating optical plate member driven by the two signals having an amplitude ratio of 7/6.

FIG. 10 shows a waveform diagram of a drive signal for an actuator according to another embodiment of the invention. In this embodiment, two actuators 160 are respectively disposed on two sides of the first pair of flexible members 152 (extending in X-axis direction), and the two actuators 160 are respectively fed two distinct drive signals to tilt the optical plate member 180 about the X-axis. Besides, two actuators 170 are respectively disposed on two sides of the second pair of flexible members 154 (extending in Y-axis direction), and the two actuators 170 are respectively fed two distinct drive signals to tilt the optical plate member 180 about the Y-axis. FIG. 10 shows the waveforms of two distinct drive signals S1 and S2 for a single axis (X-axis or Y-axis). In this embodiment, the signal S1 has a comparatively smaller amplitude A1, the signal S2 has a comparatively larger amplitude A2, and the amplitude ratio A2/A1 is set to satisfy the condition $1<(A2/A1)\leq(7/6)$ to reduce the frequency response of various frequency bands except for the fundamental frequency, with the reduction effects being enhanced in even-numbered frequency domain multiplication. FIG. 11 shows a time-frequency transform diagram illustrating the corresponding frequency component of the Fourier time series data for an operating optical plate member driven by the two signals S1 and S2 having an amplitude ratio (A2/A1) of 7/6. As can be clearly seen in FIG. 11, the frequency response of various frequency bands, except for the fundamental frequency, is considerable decreased to reduce the noise of a rotating optical plate member and achieve more stable and precise controls for rotation angles.

Figure 12:
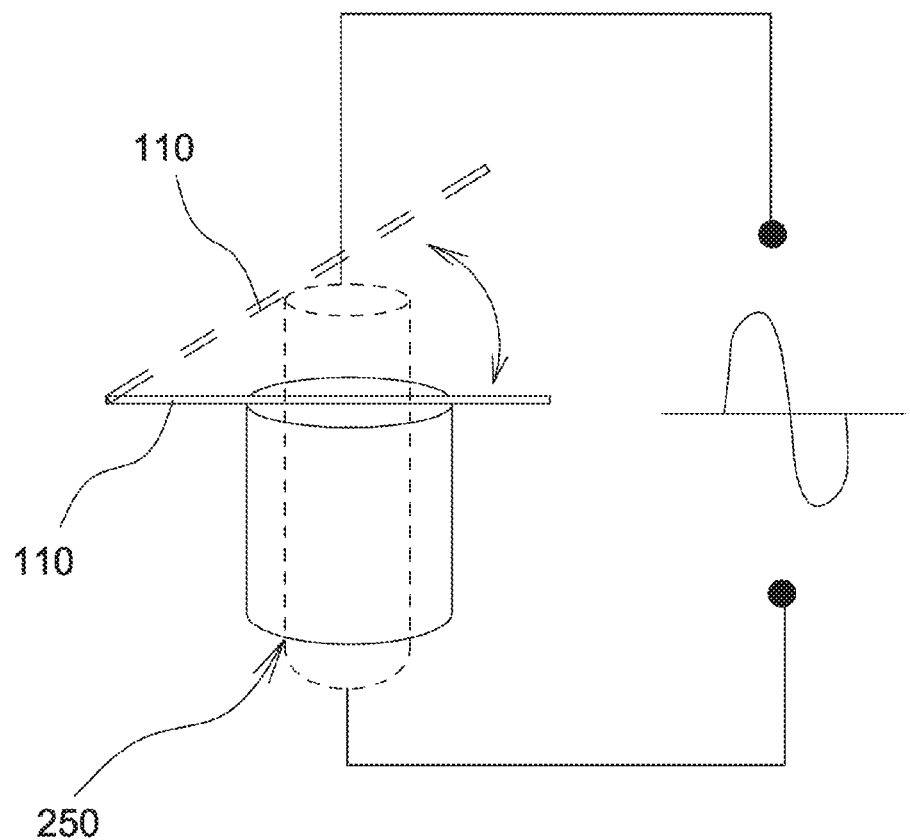
FIG. 12 shows a schematic diagram of an actuator according to another embodiment of the invention.

Note the actuator described in the above embodiments is not limited to a specific structure or operation, as long as sufficient forces can be provided to tilt or rotate the optical plate member. In other embodiment, the carrier 110 may be formed by magnetic substances, and the actuator may be an air coil or an electromagnet. The coil or the electromagnet is energized to generate attractive forces to attract the carrier and force the optical plate member 180 to tile or rotate. In other embodiment, as shown in FIG. 12, the actuator may include a piezoelectric element 250 disposed on the carrier 110. The piezoelectric element 250 may deform and change in shape when an electric field is applied, converting electrical energy into mechanical energy, to cause reciprocate movement of the optical plate member 180.

Figure 13:
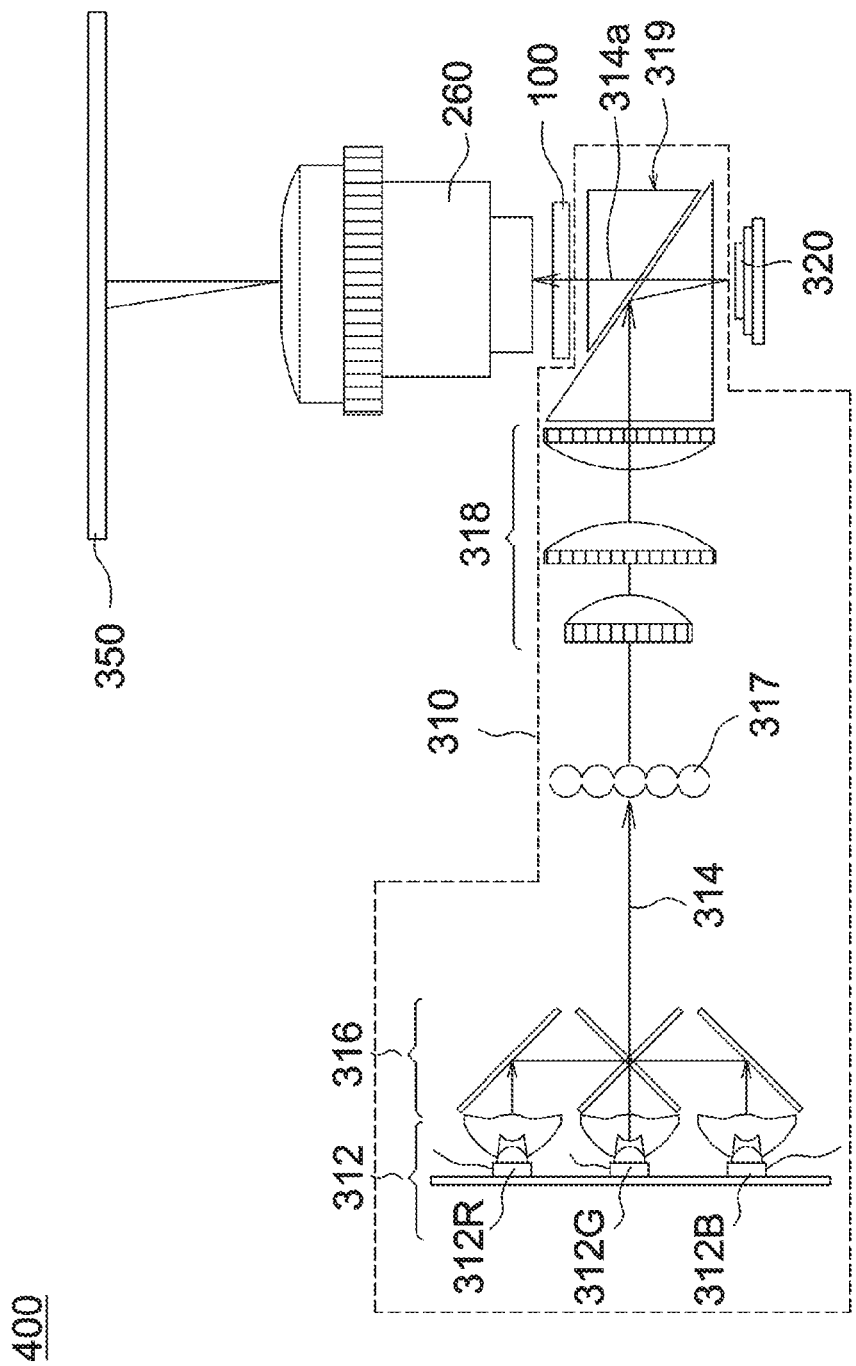
FIG. 13 shows a schematic diagram of a light path adjustment mechanism used in a projector according to an embodiment of the invention.
Figure 14:
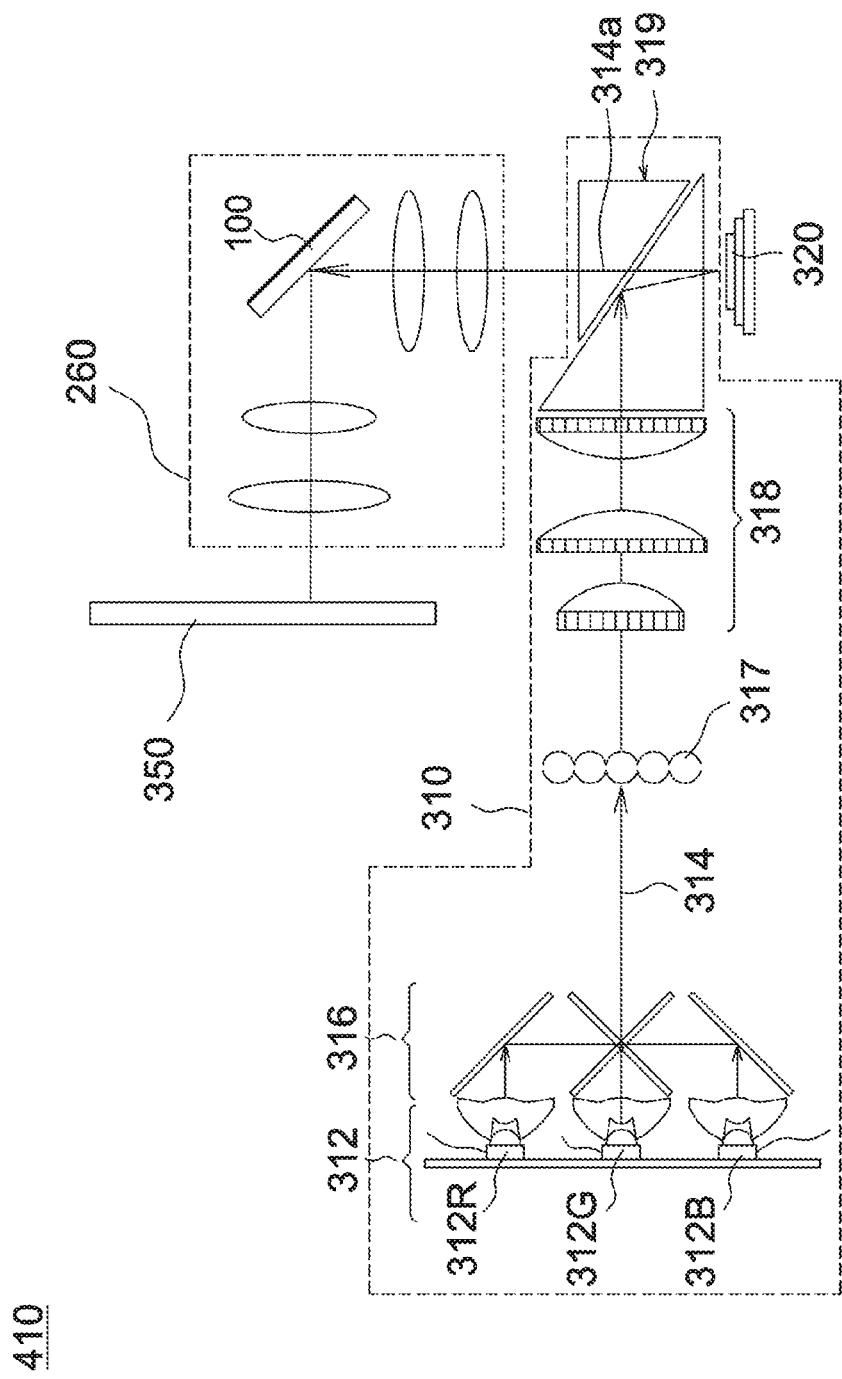
FIG. 14 shows a schematic diagram of a light path adjustment mechanism used in a projector according to another embodiment of the invention.

FIG. 13 shows a schematic diagram of a light path adjustment mechanism used in a projector according to an embodiment of the invention. Referring to FIG. 13, a projector 400 includes an illumination system 310, a light valve 320, a projection lens 260 and a light path adjustment mechanism 100. The illumination system 310 has a light source 312 for providing a light beam 314, and the light valve 320 is disposed in a propagation path of the light beam 314 and converts the light beam 314 into multiple sub images 314a. Besides, the projection lens 260 is disposed in a propagation path of the sub images 314a, and the light valve 320 is disposed between the illumination system 310 and the projection lens 260. Further, the light path adjustment mechanism 100 may be disposed between the light valve 320 and the projection lens 260 or in the projection lens 260. For example, the light path adjustment mechanism 100 may be disposed between the light valve 320 and a TIR prism 319 or between the TIR prism 319 and the projection lens 260. The light source 312 may, for example, include a red LED 312R, a green LED 312G and a blue LED 312B. Light from each of the LEDs 312R, 312G and 312B are combined by a light combiner 316 to form the light beam 314, and the light beam 314 passes a fly-eye lens array 317, a lens assembly 318 and the TIR Prism 319 in succession. Then, the light beam 314 is reflected by the TIR Prism 319, directed to the light valve 320, and converted into multiple sub images 314a by the light valve 320. The sub images 314a pass the TIR Prism 319 and are projected on a screen 350 by the projection lens 260. In this embodiment, when the sub images 314a reach the light path adjustment mechanism 100, the light path adjustment mechanism 100 may reflect the sub images 314a and alter the propagation path of the sub images 314a. Therefore, at a first time point the sub images 314a are projected on a first position (not shown) of the screen 350 by the light path adjustment mechanism 100, at a second time point the sub images 314a are projected on a second position (not shown) of the screen 350 by the light path adjustment mechanism 100, and the second position is away from the first position for a distance in a horizontal direction and/or a vertical direction. In this embodiment, the light path adjustment mechanism 100 is allowed to horizontally and/or vertically shift the position of the sub images 314a for a distance to therefore improve horizontally and/or vertically image resolutions. Although the light path adjustment mechanism is described herein as being applied to the projector 400, in other embodiments, the light path adjustment mechanism can be applied to different optical systems to achieve different effects without limitation. Besides, the arrangement and position of the light path adjustment mechanism in an optical system are not restricted. For example, in other embodiment, the light path adjustment mechanism 100 may be disposed in the projection lens 260 of an optical device 410 as shown in FIG. 14.

The term "light valve", which is commonly known in the projector industry, refers to individually-addressed optical units of a spatial light modulator. The spatial light modulator includes multiple individually-addressed optical units arranged as a one-dimensional or a two-dimensional array. Each optical unit can be individually addressed by optical or electrical signals to alter its optical properties through various physical effects (e.g., Pockels effect, Kerr effect, photo-acoustic effect, pagneto-optic effect, self electro-optic effect or photorefractive effect). Therefore, the multiple individually addressed optical units may modify incoming light beams and output image beams. The optical units may be, for example, micro mirrors or liquid crystal cells, and the light valve may be a digital micro-mirror device (DMD), a liquid-crystal-on-silicon panel (LCOS panel) or a transmissive type LCD panel.

A projector is an apparatus capable of casting an image on a screen through optical projection. In the projector industry, a variety of different types of projectors, which are distinguished from each other by the type of a light valve, may include a cathode-ray-tube type, a liquid-crystal-display (LCD) type, a digital-light-projector (DLP) type or a liquid-crystal-on-silicon (LCOS) type. An LCD-type projector that uses an LCD as a light valve is a transmissive type projector. A DLP-type projector using digital micro-mirror devices as a light valve and an LCOS-type projector using liquid crystal on silicon as a light valve are reflective type projectors that project images through light reflection.

Though the embodiments of the invention have been presented for purposes of illustration and description, they are not intended to be exhaustive or to limit the invention. Accordingly, many modifications and variations without departing from the spirit of the invention or essential characteristics thereof will be apparent to practitioners skilled in this art. It is intended that the scope of the invention be defined by the claims appended hereto and their equivalents in which all terms are meant in their broadest reasonable sense unless otherwise indicated.

What is claimed is:

1. A light path adjustment mechanism, comprising:
   a bracket;
   a carrier disposed near the bracket;
   a first pair of flexible members disposed on the carrier, wherein only one side of two sides of the first pair of flexible members is provided with an actuator;
   a second pair of flexible members disposed between the carrier and the bracket, wherein actuation of the first pair of flexible members is mechanically independent of actuation of the second pair of flexible members, and only one side of two sides of the second pair of flexible members is provided with an actuator;
   an optical plate member disposed on the carrier, wherein a linear distance between one of the first pair of flexible members and one of the second pair of flexible members is greater than a linear distance between the one of the first pair of flexible members and a geometric center of the optical plate member; and
   a prism disposed near the optical plate member, wherein a distance between closest points respectively on the prism and the optical plate member is smaller than 3 mm, and the optical plate member is disposed on the carrier provided with the first pair of flexible members.

2. The light path adjustment mechanism as claimed in claim 1, wherein the optical plate member is a lens or a mirror.

3. The light path adjustment mechanism as claimed in claim 1, wherein a distance between closest points respectively on a surface of the optical plate member and a surface of a light valve is smaller than 1 mm.

4. The light path adjustment mechanism as claimed in claim 1, wherein the bracket has an U-shaped profile.

5. The light path adjustment mechanism as claimed in claim 1, wherein the bracket and the carrier are integrally formed as one piece.

6. The light path adjustment mechanism as claimed in claim 1, wherein the actuator provided on the one side of the first pair of flexible members has a first coil and a first magnet, and the actuator provided on the one side of the second pair of flexible members has a second coil and a second magnet.

7. The light path adjustment mechanism as claimed in claim 6, wherein the first magnet and the second magnet are disposed on the bracket.

8. The light path adjustment mechanism as claimed in claim 7, wherein the first coil is disposed on the optical plate member, and the second coil is disposed on the carrier.

9. The light path adjustment mechanism as claimed in claim 1, wherein the prism is a TIR Prism, an RTIR Prism, or a PBS prism.

10. The light path adjustment mechanism as claimed in claim 1, wherein the carrier includes an inner frame and an outer frame disposed outside the inner frame.

11. The light path adjustment mechanism as claimed in claim 10, wherein the first pair of flexible members is connected between the inner frame and the outer frame, and the second pair of flexible members is connected between the outer frame and the bracket.

* * * * *